United States Patent
Cho et al.

(10) Patent No.: US 8,918,629 B2
(45) Date of Patent: Dec. 23, 2014

(54) METHOD AND APPARATUS FOR CONTROLLING OPERATION OF BOOTING VIDEO IMAGE REPRODUCING APPARATUS

(75) Inventors: Hong-jin Cho, Seoul (KR);
Byeong-seob Ko, Suwon-si (KR);
Dong-ho Rhee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1049 days.

(21) Appl. No.: 12/697,548

(22) Filed: Feb. 1, 2010

(65) Prior Publication Data

US 2011/0055538 A1    Mar. 3, 2011

(30) Foreign Application Priority Data

Aug. 25, 2009    (KR) ................. 10-2009-0078847

(51) Int. Cl.
*G06F 9/00*     (2006.01)
*G06F 15/177*   (2006.01)
*H04N 21/443*   (2011.01)
*G06F 9/44*     (2006.01)
*H04N 5/63*     (2006.01)
*H04N 5/44*     (2011.01)

(52) U.S. Cl.
CPC ............ *H04N 5/63* (2013.01); *H04N 21/4436* (2013.01); *G06F 9/4418* (2013.01); *H04N 5/44* (2013.01); *G06F 9/4403* (2013.01)
USPC .................. 713/2; 713/1; 713/300; 713/310; 713/320; 713/323; 713/324

(58) Field of Classification Search
USPC .................. 713/1, 2, 300, 310, 320, 323, 324
See application file for complete search history.

(56) References Cited

U.S. PATENT DOCUMENTS

| 5,684,998 | A  | * | 11/1997 | Enoki et al. ................. 713/310 |
| 5,832,285 | A  | * | 11/1998 | Shimada ...................... 713/323 |
| 6,125,449 | A  | * | 9/2000  | Taylor et al. ................. 713/310 |
| 6,782,472 | B2 | * | 8/2004  | Jain et al. ....................... 713/2 |
| 7,039,819 | B1 | * | 5/2006  | Kommrusch et al. ......... 713/322 |
| 7,058,831 | B2 | * | 6/2006  | Cheok et al. ................. 713/320 |
| 7,689,819 | B2 | * | 3/2010  | Yu et al. ......................... 713/2 |
| 7,779,284 | B2 | * | 8/2010  | Kumar et al. ................. 713/324 |
| 7,822,960 | B2 | * | 10/2010 | Zimmer et al. ................. 713/1 |
| 7,853,814 | B2 | * | 12/2010 | Oyanagi ....................... 713/323 |
| 8,103,891 | B2 | * | 1/2012  | Good et al. ................... 713/323 |
| 8,112,645 | B2 | * | 2/2012  | Rozen et al. ................. 713/320 |
| 8,130,698 | B2 | * | 3/2012  | Cheol .......................... 370/328 |
| 8,176,305 | B2 | * | 5/2012  | Yamaji ............................ 713/1 |
| 8,301,923 | B2 | * | 10/2012 | Aoki ............................ 713/320 |
| 2001/0047473 | A1 | * | 11/2001 | Fallon .............................. 713/2 |
| 2004/0225907 | A1 | * | 11/2004 | Jain et al. ..................... 713/320 |
| 2006/0271798 | A1 | * | 11/2006 | Tandon ......................... 713/300 |

(Continued)

FOREIGN PATENT DOCUMENTS

KR    10-2008-0064710 A    7/2008

*Primary Examiner* — Jaweed A Abbaszadeh
(74) *Attorney, Agent, or Firm* — Sughrue Mion, PLLC

(57) ABSTRACT

A method of controlling an operation of booting an image reproducing apparatus is provided. The method includes: receiving an input signal for powering off the image reproducing apparatus; receiving from a main processor a memory address where an operation status of the image reproducing apparatus is stored, according to the received input signal; storing the received memory address; and converting a system of the image reproducing apparatus into a sleep by the sub-processor.

21 Claims, 4 Drawing Sheets

(56) References Cited

U.S. PATENT DOCUMENTS

2008/0155247 A1* 6/2008 Zimmer et al. ................ 713/2
2008/0165288 A1 7/2008 Miller
2009/0259864 A1* 10/2009 Li et al. ........................ 713/323
2010/0053440 A1* 3/2010 Mortensen .................... 348/569
2011/0016300 A1* 1/2011 Lee ................................ 713/2
2011/0243527 A1* 10/2011 Hayashi ....................... 386/241

* cited by examiner

METHOD AND APPARATUS FOR CONTROLLING OPERATION OF BOOTING VIDEO IMAGE REPRODUCING APPARATUS

CROSS-REFERENCE TO RELATED PATENT APPLICATION

This application claims the priority from Korean Patent Application No. 10-2009-0078847, filed Aug. 25, 2009, in the Korean Intellectual Property Office, the disclosure of which is incorporated herein in its entirety by reference.

BACKGROUND

1. Field

Apparatuses and methods consistent with exemplary embodiments relate to controlling an operation of booting an image reproducing apparatus, and more particularly, to for controlling an operation of re-starting a system quickly when the system is powered on, by exchanging between a main processor and a sub-processor a memory address that exists before the system is powered-off.

2. Description of the Related Art

With increased demand for high-capacity and high-quality image data the image reproducing apparatuses, such as digital televisions (DTVs), have replaced analog TVs.

DTVs receive high-capacity data and provide high-quality digital broadcasting. However, since the digital broadcasting requires extensive data processing and complicated processes, a booting time of DTVs may be longer than that of analog TVs.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

One or more exemplary embodiments relate to a method of implementing a system-power-off in a DTV providing a suspend to RAM power off (SRPO) status. According to the method, before the system enters the SRPO status, a memory wake-up address and a system power-off status, which are required to perform fast-booting later, are delivered to and stored in a sub-processor. Thus, the sub-processor may be capable of providing a fast-booting sequence when a power-on signal is later received.

According to an aspect of an exemplary embodiment, there is provided a method of controlling an operation of booting an image reproducing apparatus, wherein the method includes: receiving an input signal for powering off the image reproducing apparatus; receiving from a main processor a memory address where an operation status of the image reproducing apparatus is stored, according to the received input signal; storing the received memory address; and converting a system of the image reproducing apparatus into a sleep mode by a sub-processor.

According to another aspect of an exemplary embodiment, there is provided a method of controlling an operation of booting an image reproducing apparatus, wherein the method includes: receiving an input signal for powering on the image reproducing apparatus; receiving from a sub-processor a memory address where an operation status of the image reproducing apparatus is stored, according to the received input signal; and restarting a system of the image reproducing apparatus after the main processor accesses the memory address.

According to another aspect of an exemplary embodiment, there is provided an image reproducing apparatus including: a signal receiver that receives an input signal for powering off the image reproducing apparatus; a main processor that delivers a memory address where an operation status of the image reproducing apparatus is stored, according to the received input signal; and a sub-processor that stores the delivered memory address and converts a system of the image reproducing apparatus to a sleep mode.

According to another aspect of an exemplary embodiment, there is provided a computer-readable recording medium storing a program which, when executed by a computer, causes the computer to perform the booting control method described above.

According to another aspect of an exemplary embodiment, there is provided a computer-readable recording medium storing a program which, when executed by a computer, causes the computer to perform the booting control method described above.

BRIEF DESCRIPTION OF THE DRAWINGS

The above and/or other aspects of certain exemplary embodiments will be described with reference to the accompanying drawings, in which.

DETAILED DESCRIPTION

Figure 1:
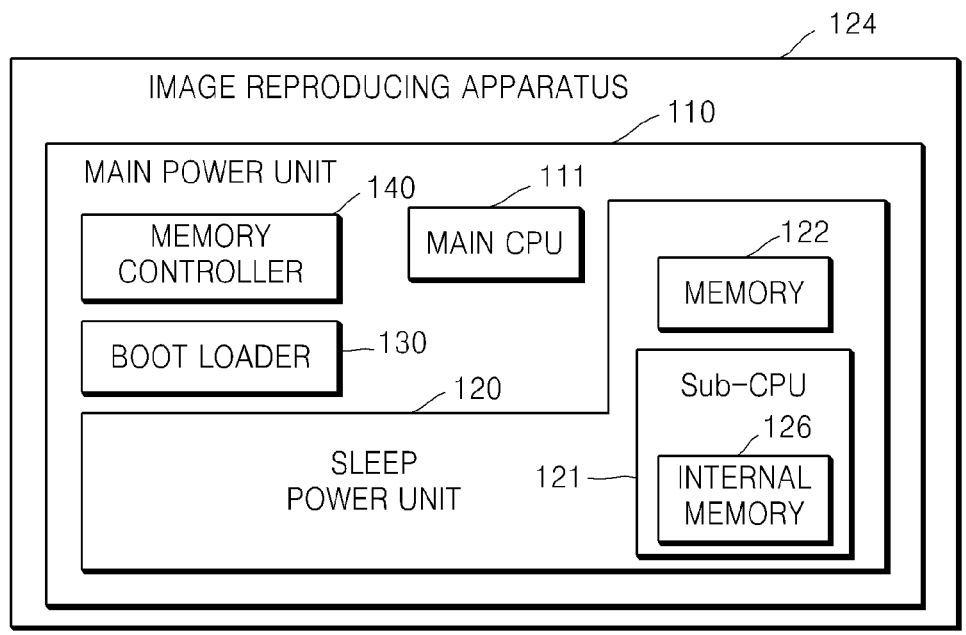
FIG. 1 is a diagram illustrating the region of a main power unit when the system is in a normal mode and the region of a sleep power unit when the system is in a sleep mode, according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a diagram of a system illustrating the region of a main power unit 110 when the system is in a normal mode and the region of a sleep power unit 120 when the system is in a sleep mode, according to an exemplary embodiment.

Referring to FIG. 1, the system of an image reproducing apparatus 124 includes elements to which power is supplied when the system is in a normal mode and in a sleep mode. The sleep mode is also referred to as a suspend mode or SRPO. In a normal mode, the main power unit 110 supplies power to a main processor, e.g., a central processing unit (CPU) 111, a memory 122, a sub-processor, e.g., sub-CPU 121, and other peripheral devices (not shown) to drive a device (not shown). However, when the system is converted into a sleep mode, power is supplied only to the sub-CPU 121 and the memory 122, which form a sleep power unit 120, so that power consumption is minimized and also, when the system resumes operations later, an operating system (OS) and various applications may be re-started without initialization of the OS and various applications.

The sleep mode or suspend mode refers to a mode in which power consumption of an image reproducing apparatus 124 is minimized, excluding a complete power-off of the image reproducing apparatus 124. For example, in the case of a TV, a display, a speaker, and a system on chip (SoC) of the TV are powered off, but a memory for performing a self-refresh operation and a unit that is related to a resume operation are powered on. An example of the unit that is related to a resume operation is a power control unit.

Figure 2:
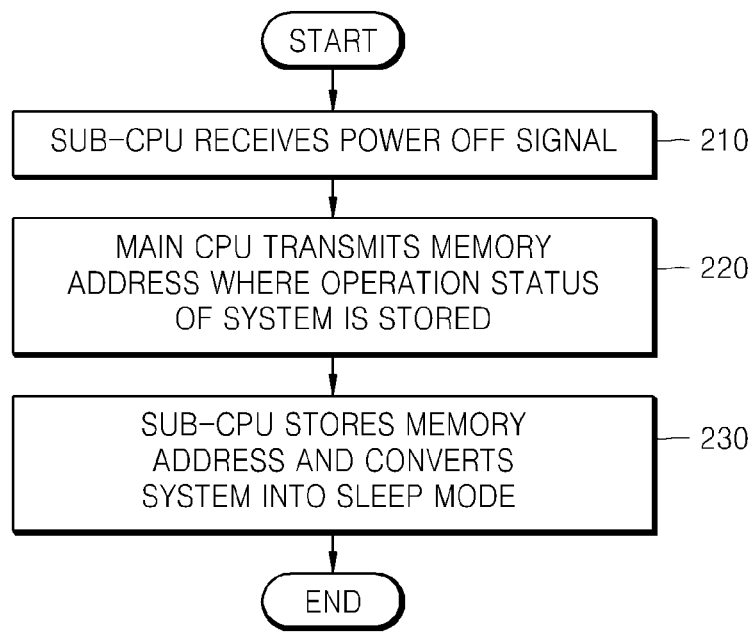
FIG. 2 is a flowchart of a control method performed by an image reproducing apparatus, according to an exemplary embodiment.

FIG. 2 is a flowchart of a control method performed by an image reproducing apparatus 124, according to an exemplary embodiment.

The present exemplary embodiment relates to a method of controlling an operation of fast-booting a CE device, such as an image reproducing apparatus, based on a wake-up address of an OS and a system power-off status which are stored in a sub-CPU, as a result of communications between the sub-CPU and the OS. In another exemplary embodiment, the wake-up address of an OS and the system power-off status may be stored in a different component of the CE device.

Referring to FIG. 2, the control method according to the present exemplary embodiment includes receiving an input signal for powering off the image reproducing apparatus (operation 210), receiving from a main CPU a memory address where an operation status of the image reproducing apparatus is stored, according to the received power-off input signal (operation 220), and storing the received memory address and then converting a system of the image reproducing apparatus into a sleep mode, wherein the converting is performed by a sub-CPU (operation 230).

The sub-CPU 121, may include a micro-computer/microprocessor based controller (MICOM). Unlike the main CPU 111, the sub-CPU 121 is supplied with power even when the system is in the sleep mode, and thus is not powered off. In the case of DTVs, a MICOM that always waits to receive an input signal transmitted by a remote controller is an example of the sub-CPU.

When a user inputs a signal for powering off the image reproducing apparatus, such as, for example, a DTV or Blu-ray disc player, the sub-CPU 121 converts the signal into a sleep mode event signal according to an option that has been set in advance, thereby generating an event signal. That is, although the system may be set to be completely powered off when a power-off signal is input according to a basic condition of the system, the system may also be set to be converted into a sleep mode for fast-booting that will occur later.

In operation 220, the main CPU 111 transmits to the sub-CPU 121 a memory address that is performed immediately after the system resumes. That is, the main CPU 111 delivers to the sub-CPU 121 a start address of the OS that will be performed when fast booting occurs later.

The memory address may be a kernel wake-up vector (KWV) value of the OS, and in this regard, before transmitting the KWV value to the sub-CPU 121, the main CPU 111 may store current contexts of the main CPU and some or all of the peripheral devices in the memory 122. The memory 122 may include a volatile memory, and in the sleep mode, the memory 122 may be periodically supplied with power by the sleep power unit 120 and may operate in a self-refresh mode. If the memory is a volatile memory and power is not supplied to the memory, all data stored in the memory is deleted. Thus, the main CPU 111 changes the operation status of the memory 122 into the self-refresh mode when a power-off signal is received. For example, in the case of DRAM, when a clock enable (CKE) signal input to the DRAM is low, the DRAM automatically operates in the self-refresh mode.

In operation 230, the sub-CPU 121 receives the memory address and stores the memory address in the internal memory 126, and converts the system into the sleep mode. A flag may be set to identify a fast booting mode in the subsequent booting operation. The flag may represent a system power-off status.

Figure 3:
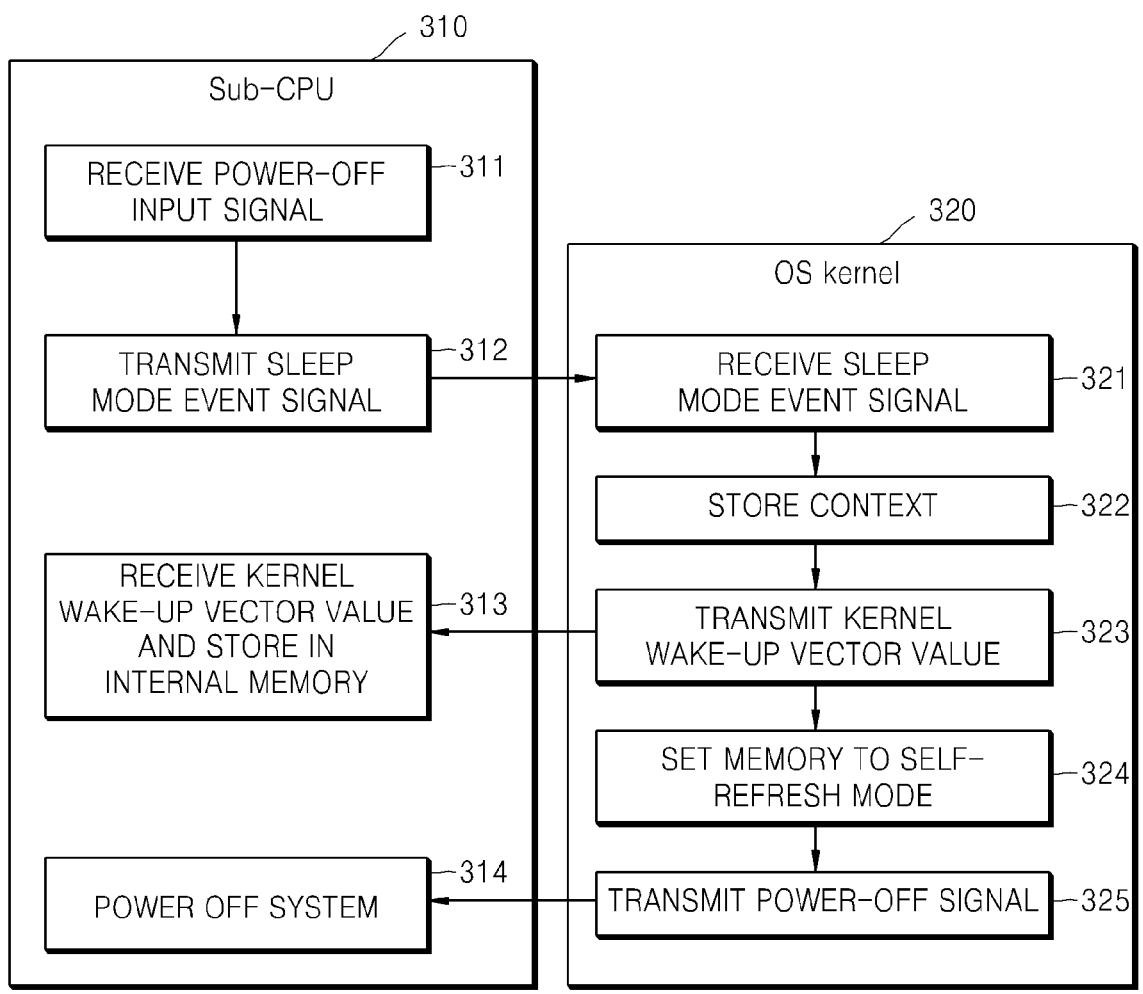
FIG. 3 is a diagram of an operation sequence when a power-off signal is received, according to an exemplary embodiment.

FIG. 3 is a diagram of an operation sequence when a power-off signal is received, according to an exemplary embodiment.

In detail, FIG. 3 illustrates an operation sequence 310 performed by the sub-CPU and an operation sequence 320 performed by the OS kernel.

Hereinafter, the operation sequence according to the present exemplary embodiment will be explained according to an operation time. First, when a user generates a power-off input signal by using, for example, a remote controller, the power-off input signal is received (operation 311) and a sleep mode event signal is transmitted to the main CPU (operation 312). An OS receives a sleep mode event signal from the sub-CPU (operation 321), and stores current contexts of the peripheral devices and the main CPU in the memory (operation 322).

Then, an OS KWV value is transmitted to the sub-CPU (operation 323), and the sub-CPU receives the OS KWV value and stores the OS KWV value in the internal memory 126 (operation 313). If the memory 122 is a volatile memory, the OS sets a volatile memory to a self-refresh mode (operation 324), and transmits a system power-off signal to the sub-CPU (operation 325). The sub-CPU powers off the entire system, except for the memory for self-refreshing (operation 314). Then, the system waits for the input of a power-on signal.

Figure 4:
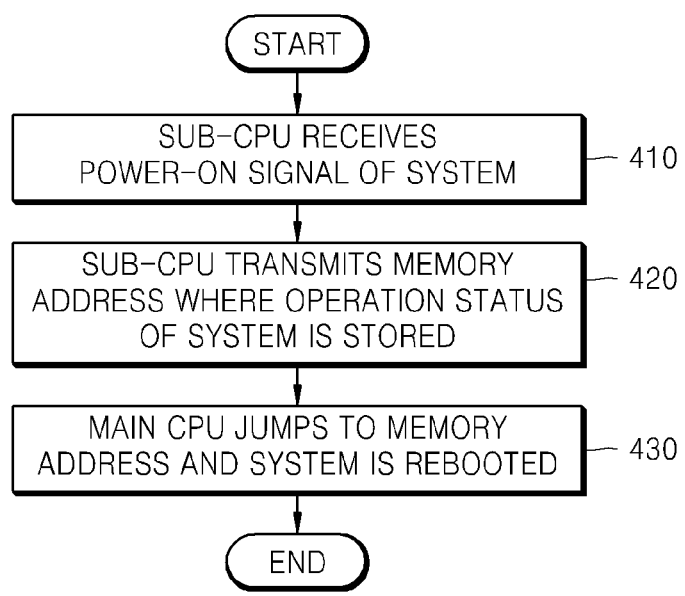
FIG. 4 is a flowchart of a control method performed by an image reproducing apparatus, according to an exemplary embodiment.

FIG. 4 is a flowchart of a booting control method performed by an image reproducing apparatus, according to an exemplary embodiment.

Referring to FIG. 4, the booting control method according to the present exemplary embodiment includes receiving an input signal for powering on the image reproducing apparatus (operation 410), receiving from a sub-CPU a memory address where an operation status of the image reproducing apparatus is stored, (operation 420), and re-starting a system of the image reproducing apparatus after the main CPU accesses the memory address (operation 430).

The booting control method may further include detecting a flag stored in the internal memory 126 of the sub-CPU after the power-on input signal from a user is received. According to the detected flag, the booting operation may be selectively performed by determining whether the booting operation is to be performed in a normal booting mode or a fast booting mode.

When the value of the flag, which represents a system power-off status, indicates a normal booting mode, the cold booting may be performed, in which, when the image reproducing apparatus is completely powered off, the image reproducing apparatus is powered on and the booting operation is performed. That is, cold booting means a booting procedure that is generally performed after the image reproducing apparatus is reset. The cold booting may be performed in the following manner. First, the image reproducing apparatus receives a power-on input corresponding to the cold booting. Then, a boot code, which is stored in a flash memory or a ROM, is moved to a DRAM. Then, cold booting is performed while the boot code and a boot image are loaded.

If the value of the detected flag indicates a fast booting mode, the system may resume operation from the sleep mode. The resume process means a return to a previous mode, that is, a normal mode from a suspend mode (sleep mode). Accordingly, the main CPU receives from the sub-CPU a start address, when the image reproducing apparatus is to perform fast booting, and jumps to the memory address, thereby re-starting the system.

Figure 5:
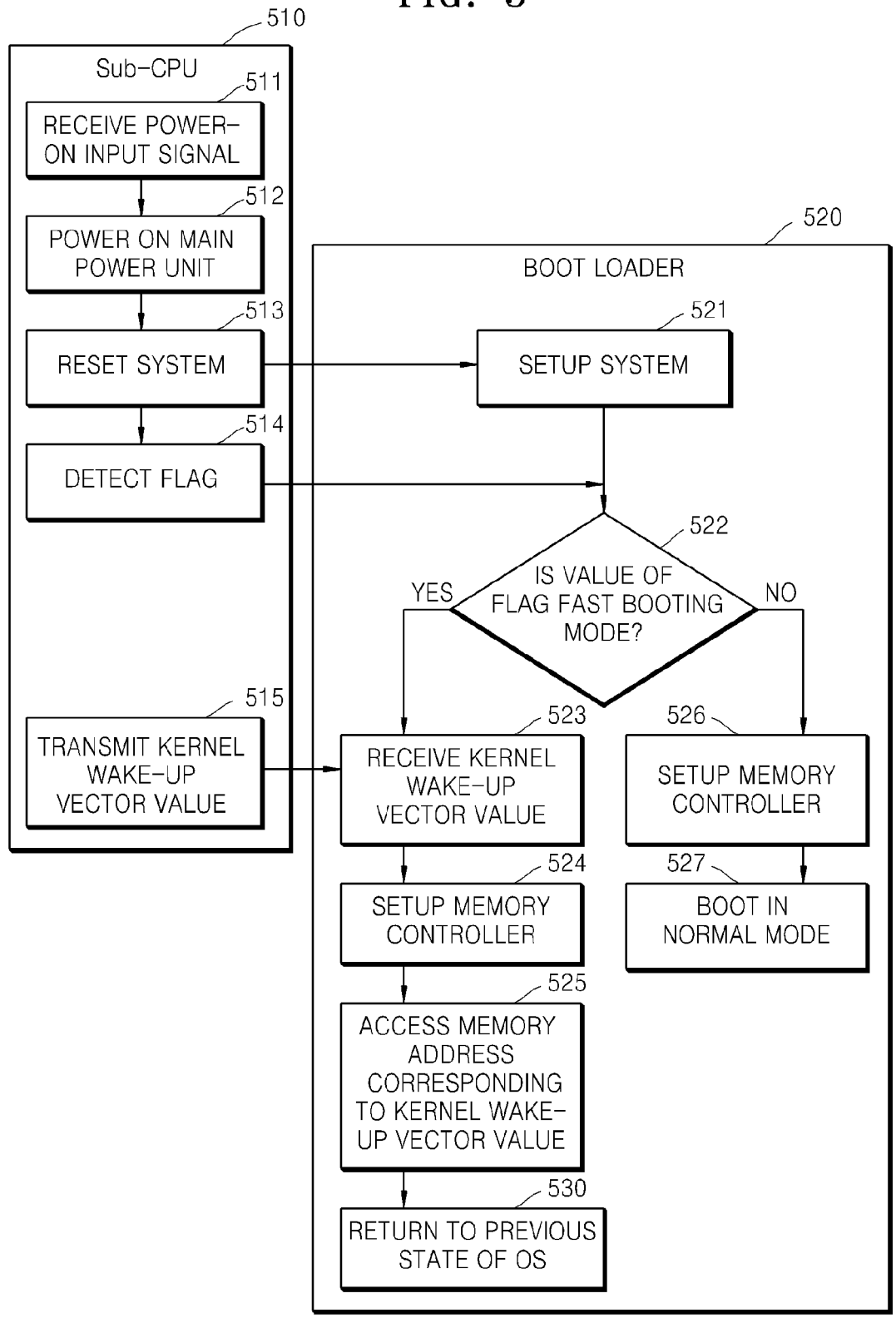
FIG. 5 is a diagram of an operation sequence for fast booting and normal booting when a power-on signal is received, according to an exemplary embodiment.

FIG. 5 is a diagram of an operation sequence for the fast booting and normal booting when a power-on signal is received, according to an exemplary embodiment. In detail, FIG. 5 illustrates an operation sequence 510 performed by the sub-CPU and an operation sequence 520 performed by the boot loader 130.

Referring to FIG. 5, the operation sequence according to the present exemplary embodiment will be made according to an operation time. First, when a user generates a power-on input signal by using, for example, a remote controller, the power-on input signal is received (operation 511), and the main power unit is powered on (operation 512). Then, the system is reset according to a general booting procedure (operation 513), and a boot loader 130 performs a system set-up operation (operation 521) and determines whether the booting operation is performed in a normal booting mode or a fast booting mode by checking the value of the flag (operation 522). That is, a sub-CPU detects a flag, which represents a system power-off status (operation 514), and transmits the flag value to the boot loader through external pins or a communication channel. If the flag indicates the fast booting mode, the boot loader requests the sub-CPU for a KWV value, and the sub-CPU transmits the KWV value to the boot loader (operation 515). The boot loader receives the KWV value (operation 523), sets up a memory controller 140 (operation 524), accesses a memory address corresponding to the received KWV value (operation 525), and returns to the state of an OS immediately before the sleep mode and restarts applications in the previous status (operation 530).

If the value of the flag does not indicate the fast booting mode, but indicates the normal booting mode, the boot loader sets up a memory controller (operation 526) and then performs cold booting. That is, a booting procedure that is generally performed after the image reproducing apparatus is reset is performed. Accordingly, after a boot code which has been stored in a non-volatile flash memory or a ROM is transferred to a DRAM, a cold booting procedure is performed in which the boot code and a boot image are loaded.

According to the booting control methods according to exemplary embodiments, a sub-CPU, such as a MICOM, manages a KWV for fast-booting and a flag for determining a fast-booting sequence. Thus, in an exemplary DTV system, fast booting can be performed from a sleep mode without incurring a cost for re-designing a SoC or a chipset of a conventional DTV.

The booting control methods according to exemplary embodiments may be performed by a computer implementable program, and may be implemented on a commercially available computer in which the program is executed on a computer-readable recording medium.

In addition, the structure of data used in exemplary embodiments above may be recorded in a computer-readable recording medium through various means.

Examples of the computer-readable recording medium include a storage medium (e.g., ROM, floppy disks, hard disks, etc.), and an optical reading medium (e.g., CD-ROMs, or DVDs).

While exemplary embodiments have been particularly shown and described, it will be understood by those of ordinary skill in the art that various changes in form and details may be made therein without departing from the spirit and scope of the present invention as defined by the following claims.

What is claimed is:

1. A method of controlling an operation of booting an image reproducing apparatus, the method comprising:
   receiving an input signal for powering off the image reproducing apparatus;
   generating an event signal for setting a system of the image reproducing apparatus to a sleep mode according to the received input signal;
   receiving from a main processor a memory address where a status of the system of the image reproducing apparatus is stored, according to the received input signal;
   storing the received memory address; and
   converting the system of the image reproducing apparatus into a sleep mode by a sub processor,
   wherein the converting the system of the image reproducing apparatus into the sleep mode comprises storing a flag indicating a booting mode of the image reproducing apparatus, and
   wherein the memory address includes a kernel wake-up vector value of an operating system which is to be executed immediately after the system of the image reproducing apparatus resumes.

2. The method of claim 1, wherein the storing the received memory address comprises storing the received memory address in an internal memory of the sub-processor.

3. The method of claim 1, wherein the sub-processor is supplied with power when the system is in the sleep mode.

4. The method of claim 3, further comprising:
   receiving the event signal by the main processor; and
   storing current contexts of a peripheral device and the main processor of the system in a memory.

5. The method of claim 4, wherein the memory includes a volatile memory which operates in a self-refresh mode when the system is in the sleep mode.

6. The method of claim 5, wherein the converting the system of the image reproducing apparatus to the sleep mode further comprises powering off the system, and
   wherein the flag represents a system power-off status and is stored in an internal memory of the sub processor.

7. A method of controlling an operation of booting an image reproducing apparatus, the method comprising:
   receiving an input signal for powering on the image reproducing apparatus;
   receiving from a sub-processor a memory address where an operation status of the image reproducing apparatus is stored, according to the received input signal;
   restarting a system of the image reproducing apparatus after a main processor accesses the memory address;
   detecting a flag indicating a booting mode of a booting operation of the image reproducing apparatus; and
   performing the booting operation of the image reproducing apparatus according to the booting mode of the detected flag,
   wherein the flag is stored in an internal memory of the sub-processor and the detecting the flag is performed after the input signal is received.

8. The method of claim 7, if a value of the flag indicates a normal booting mode, cold booting is performed, and if the value of the flag indicates a fast booting mode, a system operation is resumed from the sleep mode.

9. The method of claim 8, wherein the memory address is a kernel wake-up vector value of an operating system which is to be executed immediately after the system operation resumes.

10. An image reproducing apparatus comprising:
a signal receiver that receives an input signal for powering off the image reproducing apparatus;
a main processor that transmits a memory address where a status of a system of the image reproducing apparatus is stored, according to the received input signal; and
a sub-processor that stores the transmitted memory address and converts a system of the image reproducing apparatus to a sleep mode,
wherein the sub-processor stores a flag indicating a booting mode of the image reproducing apparatus,
wherein after the input signal is received by the signal receiver, the sub-processor generates an event signal for setting the system of the image reproducing apparatus to the sleep mode, and
wherein the memory address is a kernel wake-up vector value of an operating system which is to be executed immediately after the system of the image reproducing apparatus resumes.

11. The image reproducing apparatus of claim 10, wherein the sub-processor comprises an internal memory into which the sub-processor stores the transmitted memory address.

12. The image reproducing apparatus of claim 10, wherein the sub-processor is supplied with power when the system is in the sleep mode.

13. The image reproducing apparatus of claim 12, wherein after receiving the event signal, the main processor stores current contexts of a peripheral device and the main processor of the system in a memory.

14. The image reproducing apparatus of claim 13, wherein the memory includes a volatile memory, which operates in a self-refresh mode when the system is in the sleep mode.

15. The image reproducing apparatus of claim 14, wherein the flag indicates a system power-off status and is stored in an internal memory, and the sub-processor powers off the system.

16. An image reproducing apparatus comprising:
a signal receiver that receives an input signal for powering on the image reproducing apparatus;
a sub-processor that transmits to a main processor a memory address where an operation status of the image reproducing apparatus is stored, according to the received input signal; and
a main processor that restarts a system of the image reproducing apparatus after the main processor accesses the transmitted memory address,
wherein the sub-processor detects a flag indicating a booting mode of a booting operation of the image reproducing apparatus, and the booting operation of the image reproducing apparatus is performed according to the booting mode of the detected flag,
wherein after receiving the input signal, the sub-processor detects the flag stored in an internal memory of the sub-processor.

17. The image reproducing apparatus of claim 16, if a value of the flag indicates a normal booting mode, cold booting is performed, and if the value of the flag indicates a fast booting mode, the system resumes an operation from the sleep mode.

18. The image reproducing apparatus of claim 17, wherein the memory address is, a kernel wake-up vector value of an operating system which is to be executed immediately after the system operation resumes.

19. A non-transitory computer-readable recording medium storing a program which, when executed by a computer, causes the computer to perform the method of claim 1.

20. A non-transitory computer-readable recording medium storing a program which, when executed by a computer, causes the computer to perform the method of claim 7.

21. A method comprising:
receiving a power off signal for powering off an image reproducing apparatus;
generating an event signal for setting a system of the image reproducing apparatus to a sleep mode, according to the received power off signal;
receiving an address of a memory where a status of the image reproducing apparatus at a time of the receiving the power off signal is stored;
storing the received memory address in an internal memory of a sub-processor;
converting an operating system of the image reproducing apparatus into a sleep mode by the sub-processor;
receiving, by a main processor, a power-on signal for powering the image reproducing apparatus;
receiving from the sub-processor the memory address where the status of the image reproducing apparatus is stored;
accessing the received memory address by the main processor; and
restarting the operating system by main processor based on the accessed memory address,
wherein the converting the operating system of the image reproducing apparatus into the sleep mode comprises storing a flag indicating a booting mode of the image reproducing apparatus.

* * * * *